350-96.17

OR 3,967,877

United Stat
Heidrich et al.

[11] 3,967,877
[45] July 6, 1976

[54] COUPLER FOR COUPLING OPTICAL ENERGY TRANSMITTED BY OPTICAL FIBER TO OPTICAL WAVEGUIDE AND METHOD OF MANUFACTURE

[75] Inventors: Paul F. Heidrich, Mahopac; Carl G. Powell, Yorktown Heights, both of N.Y.

[73] Assignee: International Business Machines (IBM), Armonk, N.Y.

[22] Filed: July 16, 1974

[21] Appl. No.: 489,012

[52] U.S. Cl. .................. 350/96 C; 350/96 WG; 156/250
[51] Int. Cl.² ............................................. G02B 5/14
[58] Field of Search .................. 350/96 WG, 96 C

[56] References Cited
UNITED STATES PATENTS

| | | | |
|---|---|---|---|
| 3,584,230 | 6/1971 | Tien | 307/88.3 |
| 3,774,987 | 11/1973 | Boivin | 350/96 WG |
| 3,791,715 | 2/1974 | Lean et al. | 350/96 WG |
| 3,819,249 | 6/1974 | Borner et al. | 350/96 WG |
| 3,822,929 | 7/1974 | Heidrich et al. | 350/96 WG X |
| 3,864,019 | 2/1975 | Smolinsky et al. | 350/96 C X |
| 3,912,363 | 10/1975 | Hammer | 350/96 C |

OTHER PUBLICATIONS

Ash et al., "Interconnection of Optical Fibers to Planar Optical Integrated Circuitry," *IBM Technical Disclosure Bulletin* vol. 13, No. 9, Feb. 1971, pp. 2529–2530.

Howard, "Structure for Optical Coupling to Thin-semiconductor Layers," *IBM Technical Disclosure Bulletin* vol. 14, No. 12, May 1972, pp. 3787–3788.

Primary Examiner—John K. Corbin
Assistant Examiner—Stewart Levy
Attorney, Agent, or Firm—Pollock, Vande Sande & Priddy

[57] ABSTRACT

A coupler for coupling optical energy transmitted by optical fibers to a thin-film optical waveguide and a method of manufacture. In the method an optical fiber is sandwiched between a pair of substrates and the substrates and fiber are bonded together with a suitable material. The bonded product is then cut to provide a surface including a cross section of the fiber. After polishing this surface a thin-film optical waveguide is then provided on the surface including the fiber end. The cutting angle is chosen such that, in the assembled coupler, the exit angle with respect to the waveguide surface is greater than the critical angle of the guide material. In this fashion the optical energy coupled from fiber to guide is trapped in the guide.

The apparatus includes an optical fiber in a substrate with a cross section of the fiber in the surface of the substrate with a thin-film optical waveguide overlying the substrate surface. To insure the coupled optical energy is trapped in the guide the angle between the fiber axis in the substrate and the guide surface is greater than the critical angle for the guide material.

16 Claims, 5 Drawing Figures

COUPLER FOR COUPLING OPTICAL ENERGY TRANSMITTED BY OPTICAL FIBER TO OPTICAL WAVEGUIDE AND METHOD OF MANUFACTURE

FIELD OF THE INVENTION

The present invention relates to the field of optics and more particularly to optical couplers for coupling optical energy from a fiber optic into a thin-film waveguide.

BACKGROUND OF THE INVENTION

The prior art evidences attempts to provide a satisfactory coupling device for coupling optical energy traveling in optical fibers to thin-film optical waveguides. For instance, see "Interconnection of Optical Fibers to Planar Optical Integrated Circuitry," by Ash et al., appearing in *IBM Technical Disclosure Bulletin*, Volume 13, No. 9, pages 2529–30 (Feb. 1971). Another example of a device which is capable of coupling optical energy from an optical fiber to a thin-film waveguide is disclosed by Lean et al., in U.S. Pat. No. 3,791,715.

Although the devices referred to above may adequately couple optical energy from an optical fiber to a planar waveguide it is desirable to provide an improved coupler which meets one or more of the following criteria.

Reference to the Ash et al disclosure will illustrate that it is based on periodic structures setting up an interference pattern to cause a coupling of optical energy from a fiber to the waveguide. One of the difficulties with this approach is that it requires extremely accurate photolithography in order to transfer a pattern from a mask to a waveguide. Some of the mechanical handling requirements for performing the Ash et al. methods also do no admit of easy solution; for example, laying a fiber optic bundle along a planar waveguide with an included angle of approximately 1° is a difficult task, at best.

Another approach, such as that disclosed by Lean et al. requires the presence of electrical energy in order to "open" the coupler so that it will pass optical energy from the fiber optic to the planar waveguide. Another characteristic of Lean et al. which it may be desirable to omit is the necessity for coupling the light waves through the atmosphere, as is illustrated in FIG. 1 of Lean et al.

The foregoing disadvantages, and others, are typical of the prior art which can generally be characterized as requiring critical positioning and angular alignment of the fiber with respect to the waveguide substrate which makes manufacture of the coupler difficult.

SUMMARY OF THE INVENTION

Our invention provides an optical coupler for coupling optical energy from a fiber to a thin-film optical waveguide without requiring periodic structures which require accurate photolithography, without requiring the presence of electrical energy, without requiring critical positioning and angular alignment of the fiber optic and planar waveguide and without requiring the optical energy to travel outside an enclosed medium, that is such as air. In order to provide the foregoing advantages, a fiber optic is incorporated into a substrate so that a cross section of the fiber lies in the plane of the substrate surface. After suitable polishing an optical waveguide can then be provided on this surface. In such a coupler the optical energy propagating in t fiber will be trapped in the waveguide media provid the exit angle of the fiber with respect to the gui surface is greater than the critical angle for the index refraction of the guide material.

One method which could be used in constructing coupler of our invention sandwiches an optical fib between two blocks of substrate material. A bondi material, which may be a low melting point glass po der or an epoxy, bonds the substrates and optical fib After the bonding step the unitized structure is cut a correct angle in accordance with the foregoing crite and is then polished. An optical guiding media m then be deposited on the now polished surface.

BRIEF DESCRIPTION OF THE DRAWINGS

Our invention will be described in this specificati when taken in conjunction with the drawings append hereto. In the drawings, like reference characters ide tify identical apparatus, and, FIG. 1A is an isometric view of a coupler in accc dance with our invention.

DETAILED DESCRIPTION OF THE DRAWING

Figure 1A:
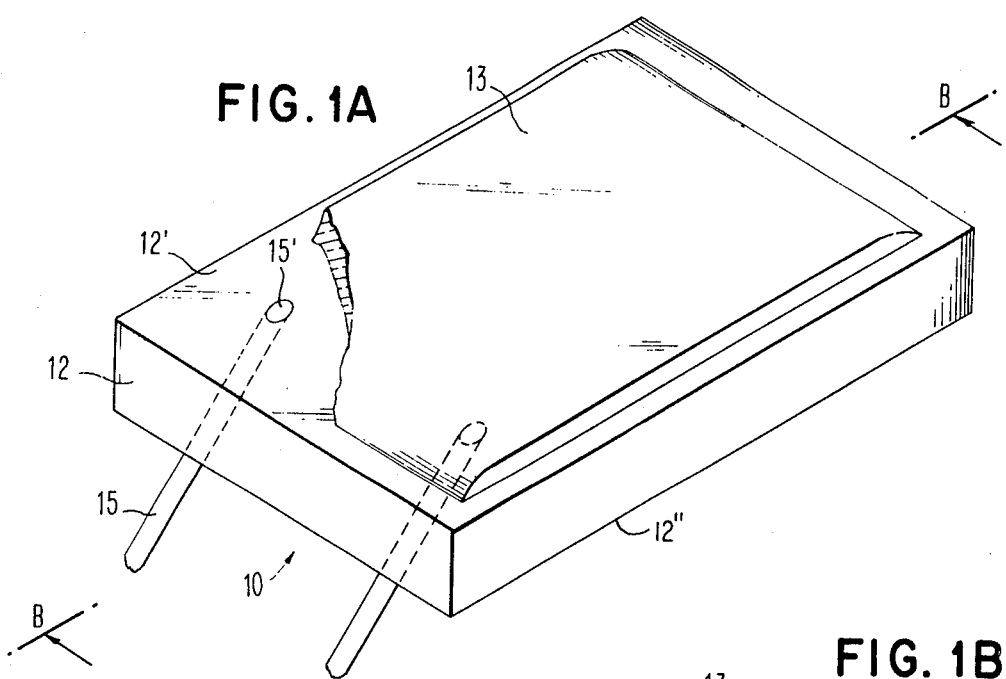
FIG. 1B is a cross section of FIG. 1A taken on lin B—B showing a typical optical energy path.

FIG. 1A illustrates a coupler 10 in accordance wi the teachings of our invention. In particular, an opti( fiber 15 is shown as being incorporated into a suital substrate 12 which may comprise quartz or other su able material. The manner in which the optical fiber is incorporated into the substrate 12 will become cle as we describe a method of manufacturing the coup of our invention. Although FIG. 1A illustrates the cc pler as including a pair of optical fibers 15, those ordinary skill in the art will understand that any nu ber of optical fibers may be coupled to a thin-film op cal waveguide in accordance with our invention. T substrate 12 includes a pair of major surfaces 12' a 12". One of the major surfaces 12' is a planar surfa in which plane a cross-section 15' of optical fiber lies. The optical fiber 15 intersects the substrate 12 the surface 12" with a cross section of said fiber ly in the planar surface 12'. As is illustrated in FIG. 1/ thin-film optical waveguide 13 has been deposit above the planar surface 12' of the substrate 12. Su thin-film optical waveguide may comprise sputtei glass, doped crystals, a liquid or other material whicl suitable for transmitting optical energy. In order maintain the optical energy within the thin-film opti waveguide 13 and prevent it from entering the si strate 12, the index of refraction of the material of substrate 12 must be less than the index of refraction the material of the waveguide 13.

Figure 1B:
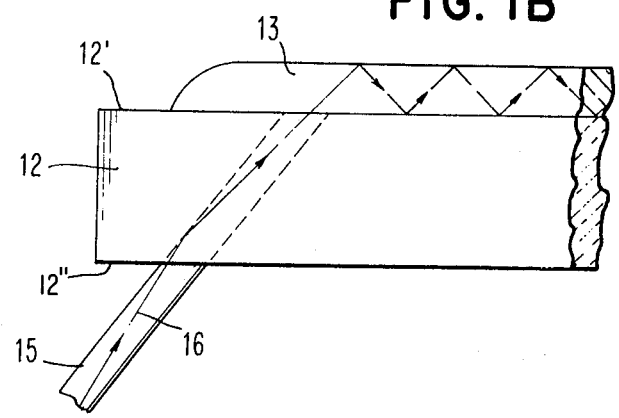

FIG. 1B is a partial cross section of the appara shown in FIG. 1A. As has been explained above, substrate 12 has a planar surface 12' in which plan cross-section 15' of the fiber optic 15 lies. This surfi 12' has deposited thereover a thin-film optical wa guide 13. As shown in FIG. 1B path 16 is a typical p for optical energy being coupled from the fiber optic to the waveguide 13. In order to maintain the opti energy within the waveguide 15 it may be clad with a material whose index of refraction is less than the index of refraction of the material of the fiber. Alternatively, if the fiber 15 is not clad then the index of refraction of material adjacent the fiber must be less than the index of refraction of the fiber material. Otherwise, as is well known to those skilled in the art, leakage of optical energy will occur from the fiber to adjacent material. As FIG. 1B shows the optical energy, traveling on path 16, is totally reflected by the surface of the waveguide 13. In order for total reflection of this energy the angle of incidence of the energy must be greater than the critical angle for the material of the optical guide 13. In order to insure this total reflection, which is a desirable goal, the angle the fiber 15 makes with the surface of guide 13 is preferably greater than the critical angle for the material of the guide 13.

Those with ordinary skill in the art will understand that optical energy will be coupled from the fiber 15 to the guide 13 without traversing an unenclosed medium; without requiring the presence of an external electrical signal and without requiring accurate photolithography pattern transfers.

Figure 2A:
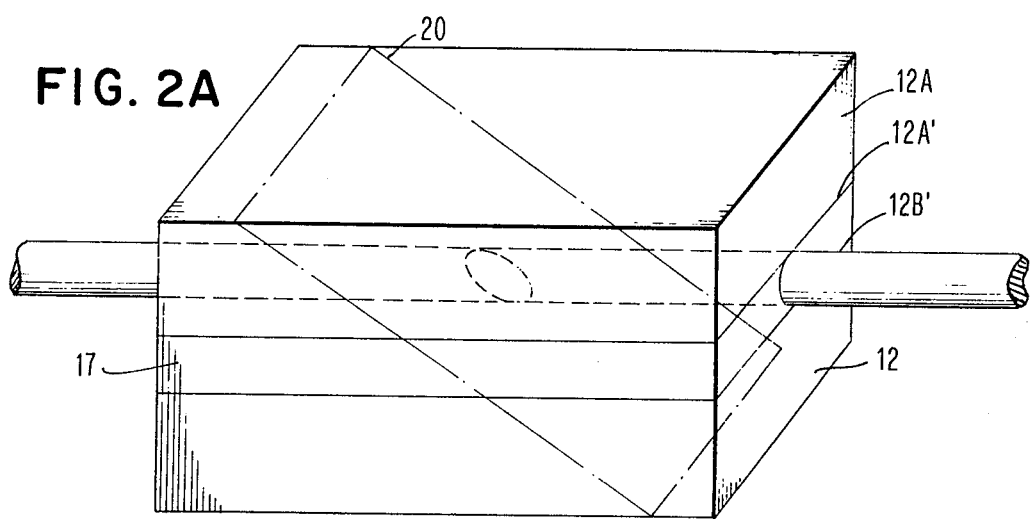
FIGS. 2A and 2B are isometric views of differe intermediate products during the course of manufa turing a coupler in accordance with our invention; a FIG. 3 is an isometric view of the use of the coup of our invention in an optical energy switching appai tus.
Figure 2B:
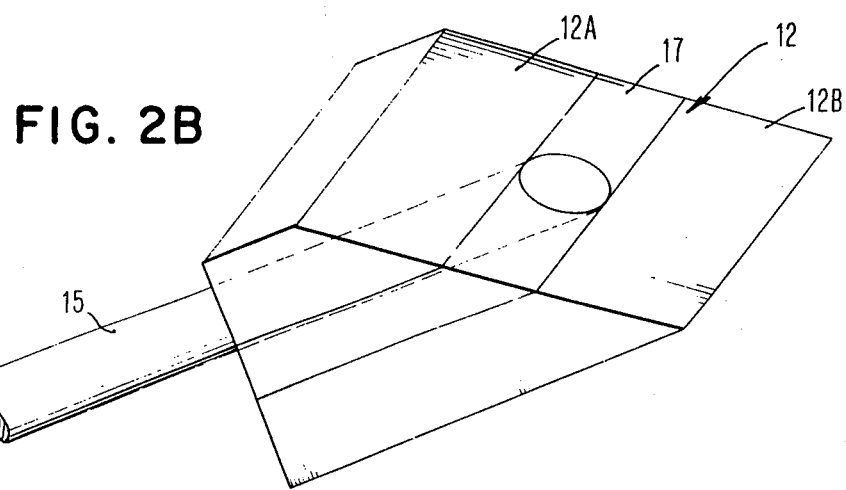

A method of manufacturing the optical coupler illustrated in FIGS. 1A and 1B will now be described with reference to FIGS. 2A and 2B. A pair of substrates 12A and 12B have sandwiched therebetween a fiber optic 15. In order to unitize these three elements a bonding agent 17 is employed. This bonding material may comprise low melting point glass powder or an epoxy or other suitable material. In particular, the fiber 15 is enclosed within surfaces 12A' and 12B' along with the bonding material. Although the surfaces 12A' and 12B' are illustrated, in FIG. 2A, as planar, those with ordinary skill in the art will understand that, if desired, the configuration of these surfaces may be made to conform more or less closely to the cross section of the fiber optic 15. Thus, surfaces 12A' and 12B' may be mirror images of one another whose shape conforms to the fiber cross section. If the fiber optic 15 is clad the particular material used as the bonding agent will not affect the light transmissive qualities of the fiber optic 15. However, if the fiber optic 15 is unclad then the index of refraction of the bonding material must be less than the index of refraction of the fiber optic in order to prevent light leakage; since the bonding agent is in intimate contact with the fiber optic 15.

In respect of the coupler illustrated in FIGS. 1A and 1B it has been pointed out that it is necessary to insure that light coupled from optic to guide be totally internally reflected and, as a corollary, the angle the fiber optic makes with the surface of the guide must be greater than the critical angle of the guide material. It is this parameter which controls the next step of the manufacturing method. The next step is a cutting operation along a plane such as 20, illustrated in FIG. 2A. The angle between the fiber 15 and the cutting plane 20 is selected so that it is greater than the critical angle of the guide material which is to be used. FIG. 2B illustrates the surface 12' which is formed as a result of the cutting operation. Included in this plane is a cross-section 15' of the fiber optic 15. The next step in the manufacturing operation is to polish the surface 12' so as to be capable of receiving an optical guide such as optical guide 13. Finally, the optical guide is deposited on the surfaces and the coupler is complete.

Figure 3:
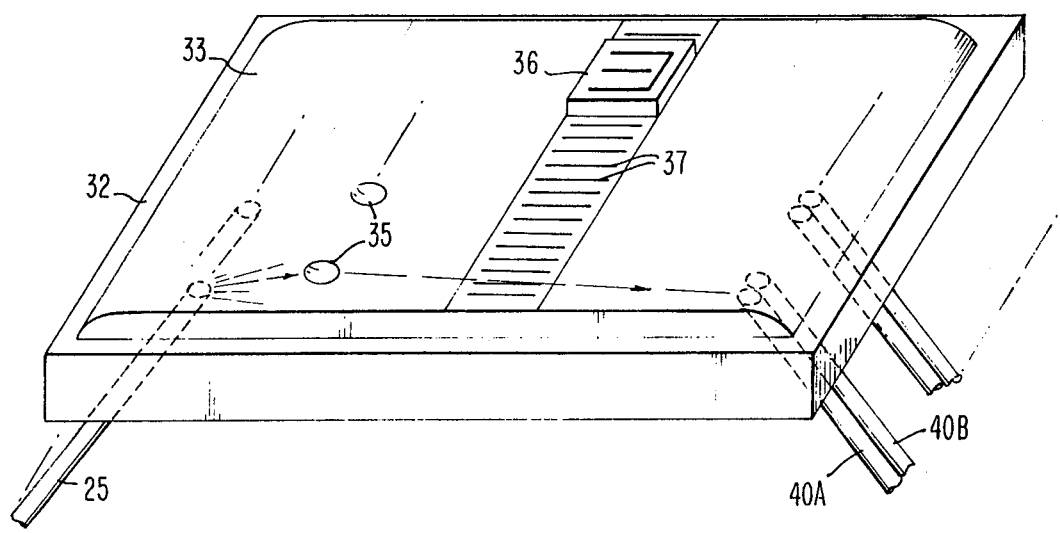

FIG. 3 illustrates a typical application in which the coupler of our invention may be employed. In particular, a plurality of input fibers 25 are illustrated. Each of the input fibers 25 are coupled to an optical waveguide 33 in accordance with the teachings of our invention. The optical guide 33 is deposited on a suitable substrate 32 and the fibers 25 are bonded to the substrate 32 in accordance with our invention. Included in the guide 33 are a plurality of thin-film lenses 35, one such lens for each of the input fibers 25. As is well known to those skilled in the art, optical energy coupled into a planar medium such as guide 33 tends to diverge and the lenses 35 are provided to either collimate or focus the optical energy in the guide 33. Located adjacent the guide 33 is a surface acoustic wave generator 36. The construction of such surface acoustic wave generators or transducers are well known in the art and therefore detailed explanation thereof is not believed necessary. Included in the guide surface is a surface acoustic wave deflector 37 the purpose of which will become clear as this description proceeds. Along the optical path of guide 33 and opposite the input fibers 25 are provided a plurality of output fibers 40A and 40B. For each input fiber 25 there is a pair of output fibers 40A and 40B. Each of the output fibers 40A and 40B are coupled, through the substrate to the optical waveguide 33 in accordance with the teachings of our invention. In the absence of a surface acoustic wave from the surface acoustic wave generator 36, the optical paths may be so arranged that input energy from any particular input fiber 25 will be directed to one of the output fibers 40A. However, in the presence of a surface acoustic wave the surface acoustic wave deflector 37 will cause optical energy from any input fiber 25 to be coupled to an output fiber 40B. Thus, the surface acoustic wave generator 36 allows the optical energy provided at any input fiber 25 to be switched between either output fiber 40A or fiber 40B.

The apparatus illustrated in FIG. 3 is but one application of our invention in a system for selectably or switchably coupling optical energy. Other applications will be apparent to those of ordinary skill in the art after reading this description.

We claim:
1. A coupler for coupling energy from an optical fiber to a thin-film optical wave guide by internal reflection in said guide comprising,
   a substrate with a surface and an optical wave guide on said surface,
   an optical fiber having a portion thereof included in said substrate with a cross section of said fiber lying in a plane of said surface.
2. A coupler of claim 1 in which an axis of said portion of said fiber included in said substrate intersects said surface at an angle greater than the critical angle of said guide.
3. The coupler of claim 1 wherein said substrate is quartz.
4. The coupler of claim 1 wherein said waveguide comprises sputtered glass.
5. The coupler of claim 1 wherein said substrate has an index of refraction less than said waveguide.
6. A coupler of claim 1 in which said substrate comprises a pair of substrate elements with said portion of said fiber included therebetween and a bonding material.
7. The coupler of claim 6 in which said bonding material is a low temperature melting point glass powder.
8. The coupler of claim 6 in which said bonding material is an epoxy.

9. A coupler for coupling energy from an optical fiber to a thin-film optical wave guide by internal reflection comprising,
   a substrate with a pair of major surfaces, an optical wave guide on one said surface,
   an optical fiber having a portion thereof included in said substrate, said optical fiber intersecting said substrate in said other surface with a cross section of said fiber lying in said one surface,
   whereby optical energy may be coupled by internal reflection from said fiber to said wave guide.

10. The coupler of claim 9 in which an axis of said portion of said fiber included in said substrate intersects said one surface at an angle greater than the critical angle of said guide.

11. The coupler of claim 9 wherein said substrate quartz.

12. The coupler of claim 9 wherein said wave gui comprises sputtered glass.

13. The coupler of claim 9 wherein said substrate h an index of refraction less than said wave guide.

14. The coupler of claim 9 in which said substra comprises a pair of substrate elements with said porti of said fiber included there between and a bondi material.

15. The coupler of claim 14 in which said bondi material is a low temperature melting point glass po der.

16. The coupler of claim 14 in which said bondi material is an epoxy.

* * * * *